(12) United States Patent
Straus et al.

(10) Patent No.: US 10,863,226 B1
(45) Date of Patent: Dec. 8, 2020

(54) OUT-OF-HOME TRANSMISSIONS FOR DIGITAL VIDEO RECORDER

(71) Applicant: Amazon Technologies, Inc., Seattle, WA (US)

(72) Inventors: James Straus, Buda, TX (US); Geun Hyoung Kim, Santa Clara, CA (US); Barry Dean Jordan, Austin, TX (US); Oscar Padilla, Georgetown, TX (US); Feroz Bokhari, San Jose, CA (US); Andrew Stewart Lochbaum, Austin, TX (US); Christopher Hong-Wen Tserng, Plano, TX (US); Aldon Dominic Almeida, Austin, TX (US); Jeremie Emilio Marcel Marie Sartor, Pflugerville, TX (US); Aaron Lockey, Round Rock, TX (US)

(73) Assignee: Amazon Technologies, Inc., Seattle, WA (US)

( * ) Notice: Subject to any disclaimer, the term of this patent is extended or adjusted under 35 U.S.C. 154(b) by 119 days.

(21) Appl. No.: 16/275,141

(22) Filed: Feb. 13, 2019

(51) Int. Cl.
*H04N 21/4147* (2011.01)
*H04L 29/08* (2006.01)
*H04L 12/46* (2006.01)
*H04N 21/643* (2011.01)

(52) U.S. Cl.
CPC ..... *H04N 21/4147* (2013.01); *H04L 12/4633* (2013.01); *H04L 67/104* (2013.01); *H04N 21/643* (2013.01)

(58) Field of Classification Search
CPC .............. H04N 21/4147; H04N 21/643; H04L 67/104; H04L 12/4633
See application file for complete search history.

(56) References Cited

U.S. PATENT DOCUMENTS

| 2016/0164933 A1* | 6/2016 | Kafle | H04W 76/10 709/219 |
| 2018/0143961 A1* | 5/2018 | Thomas | H04L 65/4015 |

* cited by examiner

*Primary Examiner* — Yassin Alata
(74) *Attorney, Agent, or Firm* — Eversheds Sutherland (US) LLP (57) ABSTRACT

Devices and methods are provided for out-of-home transmissions for digital video recorders. The device may receive, at a first port of the device, a first packet from a second device using a peer-to-peer (P2P) connection between the device and a second device, first packet including a first session identifier associated with a first socket based on the first port and a second port of the second device. The device may receive a second packet from the second device using the P2P connection, the second packet including a second session identifier. The device may determine a second socket based on the second session identifier, the second socket based on the first port and a third port of the second device. The device may send a third packet using the second socket, the third packet including the second session identifier.

20 Claims, 6 Drawing Sheets

OUT-OF-HOME TRANSMISSIONS FOR DIGITAL VIDEO RECORDER

BACKGROUND

When devices connect to one another directly, the devices may open and close sockets to transmit and receive data. Because the devices may not maintain session information about the connection, the devices may send data intended for a disconnected socket, and the data may be received on a different socket. Because a device may receive data on an open socket when the data is intended for a socket which has been closed, the device may misinterpret or misuse the data. In the context of sending and receiving video data, metrics for a closed socket may be misinterpreted or misused by an open socket, resulting in connectivity and/or playback errors.

Certain implementations will now be described more fully below with reference to the accompanying drawings, in which various implementations and/or aspects are shown. However, various aspects may be implemented in many different forms and should not be construed as limited to the implementations set forth herein; rather, these implementations are provided so that this disclosure will be thorough and complete, and will fully convey the scope of the disclosure to those skilled in the art. Like numbers in the figures refer to like elements throughout. Hence, if a feature is used across several drawings, the number used to identify the feature in the drawing where the feature first appeared will be used in later drawings.

DETAILED DESCRIPTION

Overview

Example embodiments described herein provide certain systems, methods, and devices for facilitating out-of-home (OOH) transmissions for digital video recorders (DVRs). DVRs may be devices which may record live content, and store recorded content for playback on other devices. DVRs may include one or more tuners which may record over-the-air and live-streaming content. The DVRs may provide recorded content for playback to nearby or remote (e.g., OOH) devices. When providing video and data related to video transmissions to OOH devices (e.g., devices not connected directly to the DVR or to a shared local area network as the DVR), the DVR and the OOH devices may establish a connection, such as a peer-to-peer (P2P) tunnel connection (e.g., using hole punching or communication tunneling techniques). Communication tunnels may allow the transmission of data from one type of network over another type of network using an encapsulation protocol. An application on a device may connect to a local port on the device to send and receive data to a remote peer device using a communication tunnel, and any data on the local port may be forwarded to a remote port of the remote peer device using the communication tunnel. A P2P communication tunnel may proxy multiple connections between devices.

When devices are connected to one another, the devices may use sockets, which may represent the endpoints of a P2P tunnel connection between the devices. A P2P tunnel connection may create the appearance of a P2P connection between devices on different networks (e.g., for OOH streaming video) by using a communication tunnel over one or more networks. Sockets may exist in different protocols, and multiple sockets may be opened and used in a tunnel connection. For example, sockets may be datagram-oriented as in user datagram protocol (UDP), stream-oriented as in transmission control protocol (TCP), and Unix-based. In TCP (or TCP/IP), a socket may be defined by an address (e.g., an internet protocol IP address of a device) and a port of a device. A TCP connection may be defined by the client address and port of one device, and by the client address and port of the connected device. A client address and port of one device may send data to and receive data from multiple other ports in TCP. In UDP, a port may be used to send data to an IP address. TCP tracks data transmissions to prevent data loss and corruption. UDP may be faster than TCP, but does not provide error checking. Devices may use UDP to create a pseudo-TCP connection which is more reliable than UDP. A pseudo-TCP connection may implement a subset of a TCP stack to facilitate transmissions over UDP which are more reliable than normal UDP transmissions at least partly because of the TCP error checking. Tunneling may allow for the creation of pseudo-TCP P2P connections and UDP connections.

Unix domain sockets may be endpoints for communicating data between processes executing on a same device. Unix sockets may be bidirectional using streams (e.g., TCP) and unidirectional using datagrams (e.g., UDP). Unix domain sockets identify a pathname rather than an IP address and port (e.g., a pathname associated with a kernel). A device may bind a pathname to a socket.

An application executing on a device may require one or multiple local connections to a same remote port on a P2P connected device (e.g., using a communication tunnel). For example, in streaming video applications, a device requesting and receiving streaming video from a remote DVR (e.g., a DVR on a different wireless network than the device) may request and playback recorded video content from the remote DVR using an application executing on the device. The application may use a single port to connect to a port at the remote DVR by establishing a socket, or the application may use multiple ports connecting to a same remote port of the remote DVR (e.g., multiple sockets). When a socket using respective ports at the devices has been established, a local application on either connected device may connect to the respective port of the socket to communicate data with the connected device using the socket. When a P2P tunnel is established between devices, and one device uses multiple ports to connect different sockets to the same port at a remote device, the remote device may benefit from knowing the connection state of local port connections and the corresponding socket port used by the connected device to send data. Because multiple sockets may be established within a pseudo-TCP P2P tunnel or UDP P2P tunnel connection, for example, devices may send and receive data meant for a socket which is no longer open, which may result in processing errors. For example, connection metrics for a socket which has been closed may be received by an open socket at a device, and the device may apply those metrics to use of the open socket when the data may not apply to the open socket. A device may be unaware of a socket closed by another device connected using the P2P connection, and may send data intended for the closed socket. The connected devices may experience errors, such as connectivity and playback errors (e.g., if the P2P connection is used to provide video content).

DVRs may connect with OOH devices using a pseudo-TCP P2P tunnel connection. The DVRs may use network address translation (NAT) traversal infrastructure to create a pseudo-TCP P2P tunnel or UDP P2P tunnel connection. Connection metrics associated with the P2P tunnel connection may be used by a device to perform throughput calculations, which may be used to support quality of service (QoS) algorithms facilitating the delivery of video content and data. For example, the metrics may be used to adjust bitrate and display resolution according to a QoS. The metrics may be exposed from a pseudo-TCP P2P tunnel connection and made available to the NAT traversal infrastructure. A device library may create a Unix domain socket, or another type of socket, and may identify messages received on the socket, such as requests to provide metrics. Thus, a device relying on such metrics may benefit from having access to data in the pseudo-TCP P2P tunnel connection.

In one or more embodiments, a multiplexing protocol may enable reliable data transfer over a byte-stream, allowing bytes sent from one endpoint to another endpoint to arrive in a correct order despite network disruption or data corruption. A relay may route the data from one device to another device. A device may intercept a stream of data over a P2P tunnel connection, and may add metadata such as a header. The header may include a session size, a type, and a version. The receiving device may verify the data in the header to ensure reliable data transfer, increasing reliability and security (e.g., by authenticating a sender and a receiver).

In one or more embodiments, when an OOH device receives a request (e.g., using a video application on the OHH device) to play content recorded at a remote DVR, a server may use NAT traversal infrastructure to determine the optimal network route to establish a P2P tunnel connection between the OOH device and the remote DVR. The server may use tunneling to create the P2P tunnel connection between the remote DVR and the OOH device.

In one or more embodiments, the NAT traversal infrastructure of a device may start a metrics server, which may create a Unix domain socket. The NAT traversal infrastructure may bind the socket with an abstract name (e.g., not tied to a file system). The metrics server may listen for messages received with the Unix domain socket. When a metrics request message is received, the metrics server may identify an associated pseudo-TCP P2P tunnel connection which exposes the metrics, and may determine the metrics for a P2P tunnel connection. The metrics request message may include socket information for the requesting device, and therefore may send a response with the requested metrics to the relevant socket. A device may create the same type of socket and bind the socket to an abstract name (e.g., no name at all). The device may send a request for the metrics, and if the request fails, the device may select another name corresponding to a name created by the metrics servers. If the device receives a response before a timeout, the device may return the metrics. Otherwise, the device may send an indication that no valid metrics are available for the connection. Because an application on an OOH device may stream video from a remote DVR, the devices may benefit from measuring network performance metrics of the P2P connection between the devices. The NAT traversal infrastructure of a device may make remote connections like local connections to a device, so when a transmission destination is a local host, the device may interpret a P2P OOH connection.

In one or more embodiments, the NAT traversal infrastructure may use a reliable byte stream provided by a library to communicate between two remote peer devices, such as a remote DVR and an OOH device. To enable a local application on an OOH device to send data to and receive data from the remote DVR, the NAT traversal infrastructure may open a local TCP port and may listen to the port for incoming connection requests. The local application may connect to the local port to send and receive data to the remote DVR. Data on the local port may be forwarded to a corresponding remote port on the remote DVR based on the connection established between the devices. The NAT traversal infrastructure on the remote DVR may create a client socket that connects to a local port on the OOH device. Data sent using the NAT traversal infrastructure may be sent using a socket connecting the ports, and responses received on the socket may be related through the NAT traversal infrastructure.

In one or more embodiments, the NAT traversal infrastructure may create virtual packets including session details. The NAT traversal infrastructure may facilitate serializing the virtual packets over a data stream between two devices. A remote peer device may receive the virtual packets and identify the session details (e.g., a session identifier). The session details may map to a connection (e.g., socket), allowing a receiving device to identify which connection is associated with the payload of a virtual packet. The virtual packets may be data packets having a payload, or session close packet requests (e.g., indicating that a session has ended and the receiving device should close the corresponding socket) without a payload. The virtual packets may include a header indicating a size of the payload, a version of the protocol used to transmit the virtual packets, a type (e.g., data packet or session close packet), and a session identifier associated with a socket. The virtual packets may be sent in a datagram, but may be more reliable than UDP transmissions because of the use of pseudo-TCP.

In one or more embodiments, session identifiers in data packets sent over a pseudo-TCP P2P connection may allow a receiving device to maintain the state of local sockets. The NAT traversal infrastructure for an application on a device may assign a session identifier to a newly connected socket. The NAT traversal infrastructure on the application side may include session identifiers assigned to a socket when sending any packet over a data stream (e.g., the pseudo-TCP P2P connection). NAT traversal infrastructure on the server side may identify a session identifier in a received packet. When the NAT traversal infrastructure determines that a session identifier is not associated with a currently open session, the NAT traversal infrastructure may open a new client socket (e.g., by sending a response to the identified socket), and may close any open socket. When the NAT traversal infrastructure on the server side generates responses to packets to be sent to the application side, the NAT traversal infrastructure may include a mapped session identifier for the remote socket to which the packet is intended. When the application side NAT traversal infrastructure on an OOH device receives packets, the NAT traversal infrastructure may identify the session identifier in the a packet, and may discard any received packet whose session identifier maps to an inactive session.

In one or more embodiments, if the NAT traversal infrastructure on a device identifies a request for metrics on a pseudo-TCP P2P tunnel connection, the NAT traversal infrastructure may send a request for the metrics. The metrics may include throughput, latency, and jitter. For example, a device may use throughput to determine whether to adjust video playback. An OOH device playing video received from a remote DVR may measure throughput, and a QoS algorithm may execute on the device to cause a playback adjustment if the throughput does not meet required conditions. For example, if throughput is too low, the QoS algorithm may cause the OOH device to close a socket and request video content and data to be sent on another socket. If latency or jitter do not meet QoS requirements, sockets may be closed or opened. The QoS requirements may ensure that the proper bitrate, display resolution, and other video delivery and display characteristics are met to provide quality playback of video content.

In one or more embodiments, on a remote DVR device, the NAT traversal infrastructure may identify tunneled connections, and when the NAT traversal infrastructure identifies a tunneled connection, the NAT traversal infrastructure may open a TCP connection to a media server to relay contents between the connections. If a port is flagged as being tunneled, the NAT traversal infrastructure may request and retrieve metrics. For example, using a Get Metrics function, the NAT traversal infrastructure may map a local port to a pseudo-TCP connection and identify the requested metrics.

The above descriptions are for purposes of illustration and are not meant to be limiting. Numerous other examples, configurations, processes, etc., may exist, some of which are described in greater detail below. Example embodiments will now be described with reference to the accompanying figures.

Illustrative Processes and Use Cases

Figure 1:
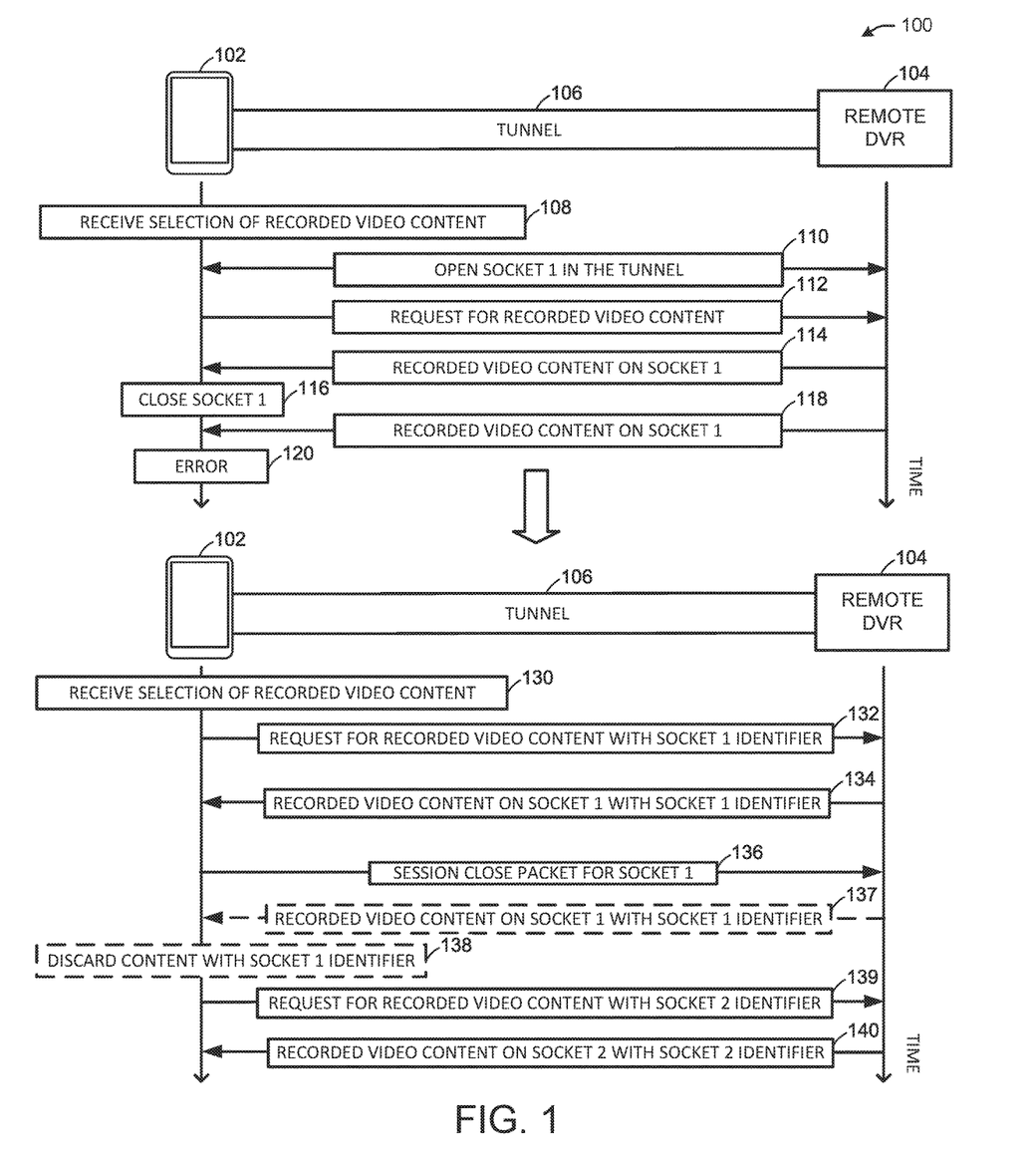
FIG. 1 illustrates an example process of out-of-home transmissions for digital video recorders (DVRs), in accordance with one or more example embodiments of the present disclosure.

FIG. 1 illustrates an example process 100 of OOH transmissions for DVRs, in accordance with one or more example embodiments of the present disclosure.

Referring to FIG. 1, the process 100 may include an OOH device 102 and a remote DVR 104, which may be connected to one another with a tunnel 106. The tunnel 106 may be a P2P tunnel using UDP or pseudo-TCP. The OOH device 102 and the remote DVR 104 may be connected to different wireless networks. At step 108, the OOH device 102 may receive a selection of recorded video content (e.g., content recorded by the remote DVR 104). For example, the OOH device 102 may use an application associated with the remote DVR 104 to set recordings at the remote DVR 104 and to select recorded content stored by the remote DVR 104 to view. At step 110, the OOH device 102 and the remote DVR 104 may open socket 1 in the tunnel 106. For example, to open the socket 1, the OOH device 102 may send a request to the remote DVR 104 identifying an endpoint for the socket 1 (e.g., an IP address and physical port), and the remote DVR 104 may send a response to the OOH device 102 identifying the endpoint. The socket request and response may be sent to a server (not shown), which may use NAT traversal infrastructure to determine the optimal network route to establish a P2P connection using the tunnel 106 between the OOH device 102 and the remote DVR 104. At step 112, the OOH device 102 may send a request for recorded video content using the tunnel 106. The request may be received by the remote DVR 104, which may send the requested video content using the socket 1 on the tunnel 106 at step 114. The OOH device 102 may close the socket 1 at step 116. For example, the OOH device 102 may determine that the connection using socket 1 is not meeting QoS requirements for streaming video playback, and may close the socket 1 due to a poor connection. If the remote DVR 104 is unaware that the session using socket 1 has been closed, the remote DVR 104 may, at step 118, continue to send recorded video content and other related data to socket 1. Because socket 1 has been closed, the OOH device 102 may experience an error 120.

Still referring to FIG. 1, the OOH device 102 may receive a selection of recorded video content (e.g., content recorded by the remote DVR 104) at step 130. At step 132, the OOH device 102 may send a request for recorded video content using the tunnel 106. The request may have a first socket identifier associated with a first socket established using the tunnel 106 (e.g., using an request-response exchange between the OOH device 102 and the remote DVR 104). At step 134, the remote DVR 104 may send recorded video content on the first socket. At step 136, the OOH device 102 may send a packet indicating that the packet is a session close packet (e.g., a disconnection request) for the first socket. The session close packet may indicate that a session has ended and that the remote DVR 104 may close the first socket. At step 137, he remote DVR 104 may continue to send data (e.g., recorded video content) including the first socket identifier to the OOH device 102 even after receipt of the session close packet, as the remote DVR 104 may not process the session close packet immediately. At step 138, when the OOH device 102 receives data with the first socket identifier, the OOH device 102 may discard the data included in a transmission with the first socket identifier. At step 139, the OOH device 102 may send a request for recorded video content using the tunnel 106. The request may have a second socket identifier associated with a second socket established using the tunnel 106. The remote DVR 104 may identify the request as a data packet for an open socket, and may send, at step 140, recorded video content and/or other data to the second socket using the second socket identifier.

In one or more embodiments, the use of the socket identifier may allow the OOH device 102 and the remote DVR 104 to maintain session information about socket connections. NAT traversal infrastructure associated with an application (e.g., an application which allows a user to select recorded content from the remote DVR 104) may assign the socket identifier to a connected socket, and may include the socket identifier in any virtual packet sent over the tunnel 106. A server-side (e.g., receiving device) NAT traversal infrastructure may identify new socket identifiers, and may open corresponding sockets and close open sockets using the tunnel 106 when a new socket identifier is recognized. The OOH device 102 and the remote DVR 104 may discard packets whose socket identifiers map to inactive sockets, allowing the OOH device 102 and the remote DVR 104 to prevent the reception of data for closed sessions, the reception of which may cause errors.

Figure 2:
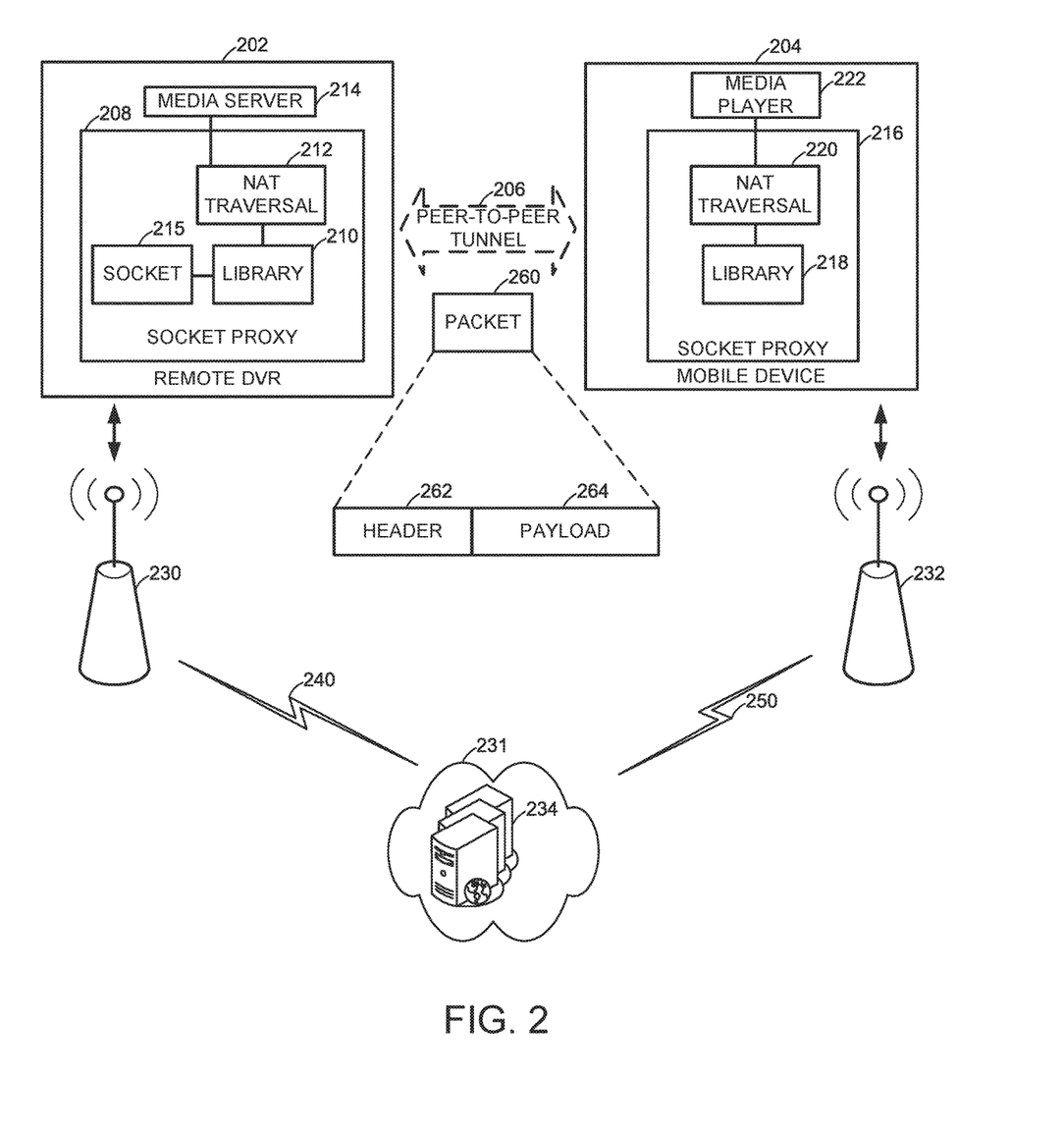
FIG. 2 illustrates a system for out-of-home transmissions for DVRs, in accordance with one or more example embodiments of the present disclosure.

FIG. 2 illustrates a system 200 for OOH transmissions for DVRs, in accordance with one or more example embodiments of the present disclosure.

Referring to FIG. 2, the system 200 may include a remote DVR 202 and a mobile device 204 (e.g., the OOH 102 of FIG. 1). The remote DVR 202 and the mobile device 204 may be connected to one another with a P2P tunnel 206. The P2P tunnel 206 may use UDP or pseudo-TCP channel tunneling to establish the appearance of a P2P connection. The remote DVR may include a socket proxy 208, which may include a library 210 and a NAT traversal infrastructure 212. The remote DVR 202 may include a media server 214 (e.g., an HTTP live-streaming server for serving HTTP live streaming media). The media server 214 may facilitate streaming media. The mobile device 204 may include a socket proxy 216, which may include a library 218 and NAT traversal infrastructure 220. The mobile device 204 may include a media player 222 which may facilitate playback of media (e.g., media provided by the remote DVR 202 or another device). The remote DVR 202 may connect to a wireless network hosted by an access point (AP) 230, and the mobile device 204 may connect to a different wireless network hosted by another AP 232. The AP 230 may connect to a communication network 231, which may facilitate connections with one or more servers 234, over a wireless connection 240, and the AP 232 may connect to the communication network 231 over a wireless connection 250. The one or more servers 234 may include a session traversal of UDP through NATs (STAN) server and/or a traversing using relay NAT (TURN) server. A TURN server may allow a device to receive IP addresses and ports (e.g., for sockets endpoints), which may be used to set up a TCP connection between devices. A STAN server may allow devices to obtain their respective public addresses and ports, which may be used to set up a UDP communication between devices. A port may refer to a communication interface through which data is sent or received. Ports may allow serial communications (e.g., one bit at a time) or parallel communications (e.g., multiple simultaneous bits).

Still referring to FIG. 2, the remote DVR 202 and the mobile device 204 may send and receive one or more packets (e.g., packet 260) using the P2P tunnel 206. The one or more packets may include data packets, session close packets (e.g., disconnection requests), socket requests/responses, connection metrics, media content, and other data. The one or more packets may include a fixed length header 262 and a variable length payload 264. The header may include indications of a protocol version, a packet type, a session identifier, and a size of the payload. The payload 264 may be of length zero if the packet 260 is a session close packet, and may have a length greater than zero if the packet 260 is a data packet.

In one or more embodiments, the NAT traversal infrastructure 212 and the NAT traversal infrastructure 220 may use a reliable byte stream provided by the respective libraries (e.g., library 210 and library 218) to communicate using the P2P tunnel 206. The NAT traversal infrastructure 212 and the NAT traversal infrastructure 220 may open local sockets may listen to the sockets for incoming data. The media server 214 may connect to a local socket at the remote DVR 202 to send and receive data using the P2P tunnel 206, and the media player 222 may connection to a local socket at the mobile device 204 to send and receive data using the P2P tunnel 206. Because the NAT traversal infrastructure 212 and the NAT traversal infrastructure 220 may not maintain session information about socket connections using the P2P tunnel 206, the NAT traversal infrastructure 212 and the NAT traversal infrastructure 220 may send data to an open socket when the data is intended for a socket which has been closed. If data is received on the wrong socket in this manner, any application (e.g., the media player 222) using the open socket may receive erroneous data which may cause errors or suboptimal operation. The P2P tunnel 206 is shown in FIG. 2 as a direct connection between the remote DVR 202 and the mobile device 204, however, the P2P tunnel 206 may connect the remote DVR 202 and the mobile device 204 through the AP 230 and the AP 232 using the network 231. The P2P tunnel 206 may be created by the remote DVR 202 and the mobile device 204 using TCP hole punching or UDP tunneling. For example, TCP hole punching may refer to using the NAT traversal infrastructure 212 to establish a TCP or pseudo-TCP connection between the remote DVR 202 and the mobile device 204.

In one or more embodiments, the NAT traversal infrastructure 212 and the NAT traversal infrastructure 220 may generate virtual packets including session details, and the devices may serialize the virtual packets over the data stream for the P2P tunnel 206 to allow the receiving device to identify the connection (e.g., socket) to which the virtual packet belongs. The NAT traversal infrastructure 212 and the NAT traversal infrastructure 220 may add a header (e.g., four bytes) plus a variable length payload (e.g., up to 64 KB) to any data packet. The header may indicate the version of a protocol (e.g., four bits), a type of packet, such as a data packet including a payload or a session close packet without a payload indicating a session has ended (e.g., four bits), a session identifier (socket identifier—eight bits), an indication of a payload size (e.g., 16 bits), and a variable length payload (e.g., up to 64 KB).

In one or more embodiments, to maintain a connection state of a local socket, the NAT traversal infrastructure 212 and the NAT traversal infrastructure 220 may assign a session identifier to a newly connected socket. The NAT traversal infrastructure 212 and the NAT traversal infrastructure 220 may include the session identifier in any virtual packet sent using the P2P tunnel 206 provided by the library 210 and the library 218 (e.g., Libnice libraries). The NAT traversal infrastructure 212 may identify new session identifiers (e.g., session identifiers which do not match any currently open sockets), may determine that a new client socket is needed, and may close any existing socket connected to the mobile device 204. When the NAT traversal infrastructure 212 responds to data packets received from the mobile device 204, the NAT traversal infrastructure 212 may include a mapped session identifier (e.g., as included in a received data packet) for the respective socket at the mobile device 204. When the NAT traversal infrastructure 220 receives data packets from the remote DVR 202, the NAT traversal infrastructure 220 may identify the session identifier and may discard any packets who session identifiers map to an inactive session.

In one or more embodiments, the P2P tunnel 206 may allow multiple socket-based connections between the remote DVR 202 and the mobile device 204. For example, the media player 222 may be an application executing on the mobile device 204, and may use one or more multiple ports to establish socket-based connections using the P2P tunnel 206. Because multiple ports of the mobile device 204 may connect to the same port at the remote DVR 202, the mobile device 204 may include session identifiers in any packets sent using the P2P tunnel 206, allowing the remote DVR 202 to identify which socket is used and where to transmit responses to the mobile device 204. The mobile device 204 may transmit session close packets (e.g., disconnection requests) using the P2P tunnel 206 indicating that a session should expire and that a socket associated with a session may be closed, and the remote DVR 202 may close sockets using a respective port.

In one or more embodiments, the mobile device 204 may be responsible for maintaining QoS requirements for streaming media using the media player 222. The media player may determine whether to use a tunneled connection or direct HTTP connection. The mobile device 204 may use TCP hole punching to create the P2P tunnel 206 to download media segments from the remote DVR 202. The library 218 may allow the mobile device 204 to receive a file descriptor of a connected socket, which allows the library 218 to make a connection to the remote DVR 202. The one or more servers 234 may use a set of commands to initiate the connection using the P2P tunnel 206. The P2P tunnel 206 may use UPD or pseudo-TCP. The remote DVR 202 and the mobile device 204 may exchange device details in a series of offerings and answers to allow the socket proxy 208 and the socket proxy 216 (e.g., using respective interfaces to the library 210 and the library 218) to establish a connection. The socket proxy 208 may create a server using the socket 215, and may proxy multiple tunnel connections (e.g., the P2P tunnel 206). The library 210 and the library 218 may negotiate a connection using STUN or TURN. The remote DVR 202 and the mobile device 204 may establish a socket using the P2P tunnel 206 and may identify data received on the socket at the respective device.

In one or more embodiments, the remote DVR 202 may include a socket 215. The remote DVR 202 may create the socket 215 and may identify messages on the socket 215. The remote DVR 202 may receive requests to obtain connection metrics, and when so requested, may send a request for the metrics and receive a response with the metrics. The metrics may be used to evaluate a connection using the P2P tunnel 206. The socket 215 may use UDP or TCP. When a message is received using the socket 215, the remote DVR 202 may identify a session identifier, determine the socket associated with the session identifier, determine a pseudo-TCP connection associated with the request, and determine connection metrics for the connection. Using the socket identifier, the metrics server may determine to which socket to reply with requested connection metrics. Once a device receives a request for connection metrics, the device may poll for a response until a timeout is reached. If connection metrics are received, the device may send the connection metrics to the connecting device based on the session identifier from a request message. If no connection metrics are received, the device may respond to the requesting device with an indication (e.g., a flag) that no valid metrics are available for a particular connection.

In one or more embodiments, the mobile device 204 may include a personal computer (PC), a wearable wireless device (e.g., bracelet, watch, glasses, ring, etc.), a desktop computer, a mobile computer, a laptop computer, an Ultrabook™ computer, a notebook computer, a tablet computer, a server computer, a handheld computer, a handheld device, an internet of things (IoT) device, a sensor device, a PDA device, a handheld PDA device, an on-board device, an off-board device, a hybrid device (e.g., combining cellular phone functionalities with PDA device functionalities), a consumer device, a vehicular device, a non-vehicular device, a mobile or portable device, a non-mobile or non-portable device, a mobile phone, a cellular telephone, a PCS device, a PDA device which incorporates a wireless communication device, a mobile or portable GPS device, a DVB device, a relatively small computing device, a non-desktop computer, a "carry small live large" (CSLL) device, an ultra mobile device (UMD), an ultra mobile PC (UMPC), a mobile internet device (MID), an "origami" device or computing device, a device that supports dynamically composable computing (DCC), a context-aware device, a video device, an audio device, an A/V device, a set-top-box (STB), a Blu-ray disc (BD) player, a BD recorder, a digital video disc (DVD) player, a high definition (HD) DVD player, a DVD recorder, a HD DVD recorder, a personal video recorder (PVR), a broadcast HD receiver, a video source, an audio source, a video sink, an audio sink, a stereo tuner, a broadcast radio receiver, a flat panel display, a personal media player (PMP), a digital video camera (DVC), a digital audio player, a speaker, an audio receiver, an audio amplifier, a gaming device, a data source, a data sink, a digital still camera (DSC), a media player, a smartphone, a television, a music player, or the like. Other devices, including smart devices such as lamps, climate control, car components, household components, appliances, etc. may also be included in this list.

The devices may be configured to communicate via the communications network 231, wirelessly or wired. The communications network 231 may include, but not limited to, any one of a combination of different types of suitable communications networks such as, for example, broadcasting networks, cable networks, public networks (e.g., the Internet), private networks, wireless networks, cellular networks, or any other suitable private and/or public networks (e.g., a non-Wi-Fi network may not require the AP 230 or the AP 232). Further, the communications network 231 may have any suitable communication range associated therewith and may include, for example, global networks (e.g., the Internet), metropolitan area networks (MANs), wide area networks (WANs), local area networks (LANs), or personal area networks (PANs). In addition, the communications network 231 may include any type of medium over which network traffic may be carried including, but not limited to, coaxial cable, twisted-pair wire, optical fiber, a hybrid fiber coaxial (HFC) medium, microwave terrestrial transceivers, radio frequency communication mediums, white space communication mediums, ultra-high frequency communication mediums, satellite communication mediums, or any combination thereof.

The remote DVR 202, the mobile device 204, the AP 230, and/or the AP 232 may include one or more communications antennas. The one or more communications antennas may be any suitable type of antennas corresponding to the communications protocols used by the devices, the AP 230, and/or the AP 232. Some non-limiting examples of suitable communications antennas include Wi-Fi antennas, Institute of Electrical and Electronics Engineers (IEEE) 802.11 family of standards compatible antennas, directional antennas, non-directional antennas, dipole antennas, folded dipole antennas, patch antennas, multiple-input multiple-output (MIMO) antennas, or the like. The one or more communications antennas may be communicatively coupled to a radio component to transmit and/or receive signals, such as communications signals to and/or from the devices, the AP 230, and/or the AP 232.

The remote DVR 202, the mobile device 204, the AP 230, and/or the AP 232 may include any suitable radio and/or transceiver for transmitting and/or receiving radio frequency (RF) signals in the bandwidth and/or channels corresponding to the communications protocols utilized by any of the remote DVR 202, the mobile device 204 the AP 230, and/or the AP 232 to communicate with each other. The radio components may include hardware and/or software to modulate and/or demodulate communications signals according to pre-established transmission protocols. The radio components may further have hardware and/or software instructions to communicate via one or more Wi-Fi and/or Wi-Fi direct protocols, as standardized by the Institute of Electrical and Electronics Engineers (IEEE) 802.11 standards.

In one or more embodiments, the remote DVR 202 may receive streaming video using the wireless connection 240, and may receive over-the-air programming using one or more antennas (not shown). The remote DVRs may include one or more tuners which may receive audio and video signals which may be played and recorded.

Figure 3:
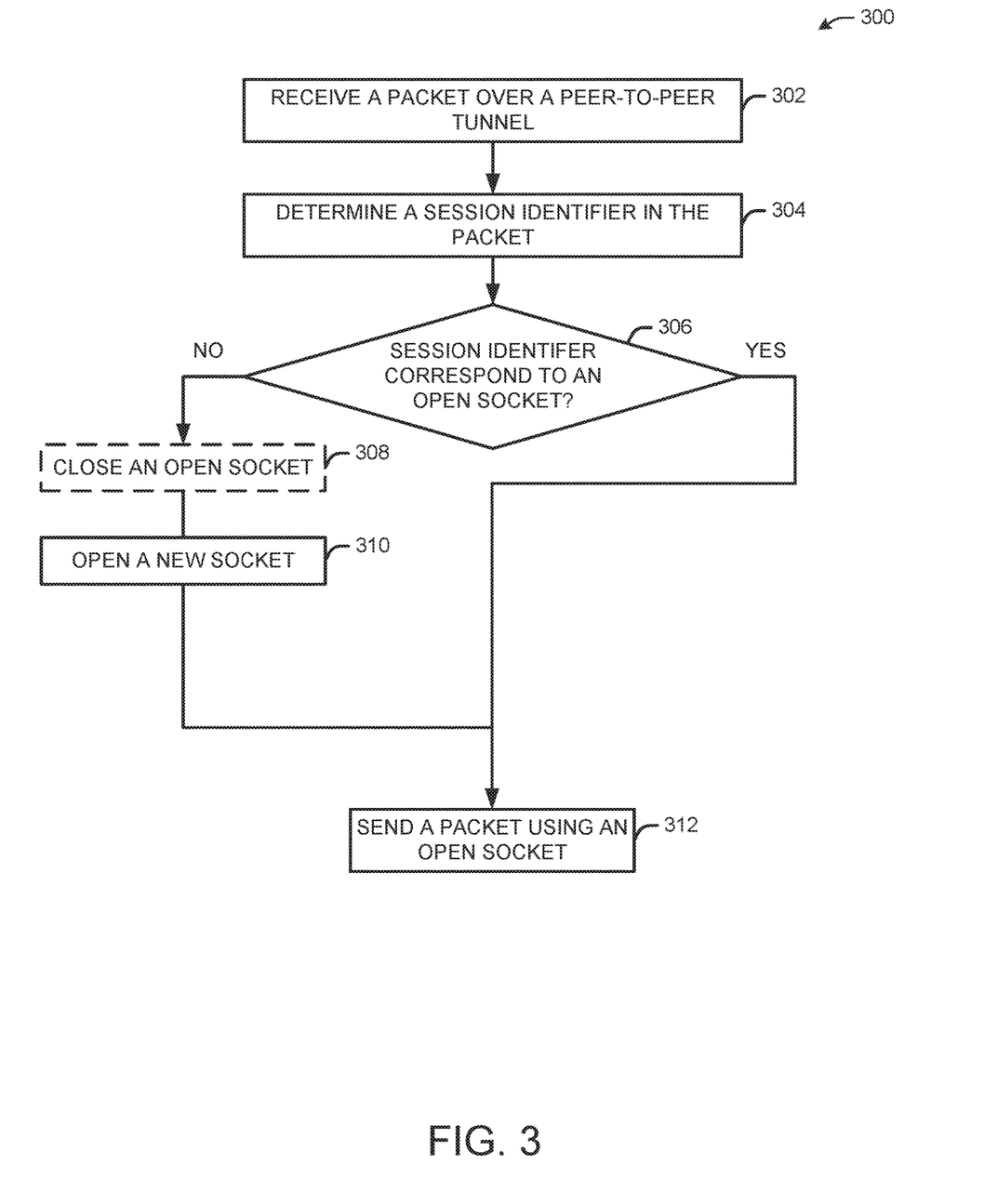
FIG. 3 illustrates a flow diagram for a process for out-of-home transmissions for DVRs, in accordance with one or more example embodiments of the present disclosure.

FIG. 3 illustrates a flow diagram for a process 300 for OOH transmissions for DVRs, in accordance with one or more example embodiments of the present disclosure.

At block 302, a device (e.g., the remote DVR 202 of FIG. 2) may receive a packet over a P2P tunnel (e.g., the P2P tunnel 206 of FIG. 2). The packet may be a data packet or a session close packet (e.g., a disconnection request). A data packet may include a payload, and the session close packet may not including a payload. The packet may include a header indicating a protocol version, a type of packet (e.g., data or session close), a session identifier, and a payload size. The packet may include a request for media content or data, a request for connection metrics associated with the connection between the device and another device, media content, connection metrics, or other data. If the packet is a session close packet, the device may close the socket used to receive the packet. The packet may be received at a port of the device from another port at a peer device connected by the P2P tunnel. The device may receive packets over multiple open sockets using the P2P tunnel, so multiple sockets may be open in the P2P tunnel at a given time.

At block 304, the device may determine a session identifier in the received packet. The session identifier may correspond to an open socket (e.g., an existing session), or may correspond to a new socket (e.g., different from an open socket being used by the connection between the device and the other device). The session identifier may be included in a header of the received packet, and may be a numerical identifier assigned to a socket on the device which sent the packet. The numerical identifier may map to a socket, which may correspond to a device address and physical port.

At block 306, the device may determine whether the session identifier corresponds to an open socket (e.g., an existing session between the device and the other device). The device may identify the numerical identifier in the session identifier field of the header of the received packet, and may determine the socket associated with the session identifier. The device may determine whether a communication session is open with the socket at the device which sent the packet. If not, the process 300 may continue at block 308 and block 310. If so, the process 300 may continue at block 312.

At block 308, the device may close any open socket associated with an existing communication session using the tunnel between the device and the other device. For example, when an open socket is connected to the socket identified by the session identifier, the device may close the socket. Multiple sockets may be open at a given time, and one or more sockets may be closed if the session identifier is associated with a socket which is not yet open. At block 310, the device may open a new socket to connect to the port or pathname of the other device, as indicated by the socket identifier. If the session identifier does not map to an existing communication session using the tunnel, the device may open a new socket and assign a session identifier to any packets sent using the open socket.

At block 312, the device may send one or more packets using an open socket (e.g., the socket used to receive the packet or the newly opened socket based on the session identifier). When sending a packet, the device may include a header with the session identifier associated with the socket used by the tunnel between the device and the other device. The device may identify packets with session identifiers which are not associated with open sessions, and may discard the packets. The packets may include media content, connection metrics, and other data. To establish a new socket, the device and the other device may exchange a request and response with socket information to establish the endpoints or pathname for a respective socket.

Figure 4:
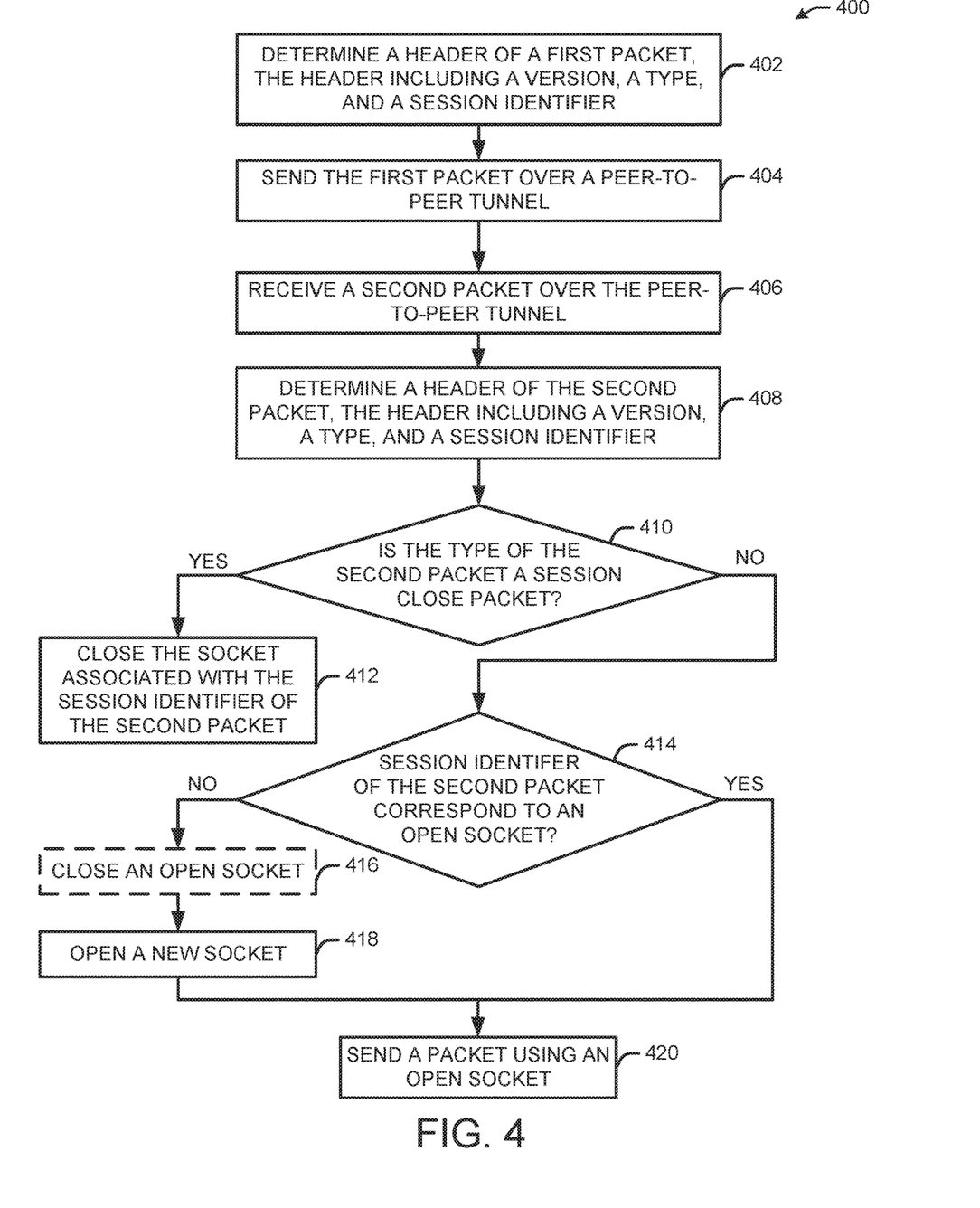
FIG. 4 illustrates a flow diagram for a process for out-of-home transmissions for DVRs, in accordance with one or more example embodiments of the present disclosure.

FIG. 4 illustrates a flow diagram for a process 400 for OOH transmissions for DVRs, in accordance with one or more example embodiments of the present disclosure.

At block 402, a device (e.g., the remote DVR 202 of FIG. 2, the mobile device 204 of FIG. 2) may determine a header of the first packet. The header may include fields indicating a size of the payload, a version of the protocol used to transmit the first packet, a type (e.g., data packet or session close packet), and a session identifier associated with a socket used by the connected device to send the first packet. A multiplexing protocol used by the device may enable reliable data transfer over a byte-stream of the tunnel. The device may intercept the stream of data to be sent using the tunnel, and may add the header to the data. For example, the device may be a client device which may request video recorded by a remote DVR, and may add a header with the session identifier to any packet sent using a P2P tunnel between the device and the remote DVR. The device may be a remote DVR which may provide recorded content to a remote peer using a P2P tunnel, and may add a header to any data sent using the tunnel. One port of one peer device may connect to multiple ports of the other peer device by using multiple respective sockets. The P2P tunnel may allow for multiple socket-based connections between the peer devices.

At block 404, the device may send the first packet over a P2P tunnel (e.g., the P2P tunnel 206 of FIG. 2). The packet may be a data packet or a session close packet. A data packet may include a payload, and the session close packet may not including a payload. The packet may include a header indicating a protocol version, a type of packet (e.g., data or session close), a session identifier, and a payload size. The packet may include a request for media content or data, a request for connection metrics associated with the connection between the device and another device, media content, connection metrics, or other data.

At block 406, the device may receive a second packet over a socket in the P2P tunnel. A data packet may include a payload, and the session close packet may not including a payload. The packet may include a header indicating a protocol version, a type of packet (e.g., data or session close), a session identifier, and a payload size. The packet may include a request for media content or data, a request for connection metrics associated with the connection between the device and another device, media content, connection metrics, or other data. The device may receive packets over multiple open sockets using the P2P tunnel, so multiple sockets may be open in the P2P tunnel at a given time.

At block 408, the device may determine a header of the second packet received over the P2P tunnel. The second packet may be received over a socket using the P2P tunnel. The socket used to receive the second packet may be the same socket as the socket used to send the first packet, or may be a different socket. The device may identify one or more fields in the header, which may have a fixed length in any packets sent or received using the P2P tunnel. The fields of the header may include a protocol version, a type of packet, and a session identifier. The device may determine whether the second packet is a data packet or a session close packet.

At block 410, the device may determine, based on the packet type field of the header of the second packet, whether the second packet is a session close packet or a data packet. When the device determines that the second packet is a session close packet, the process 400 may continue to block 412, where the device may close the socket associated with the session identifier of the second packet. The device may map a numerical identifier of the session identifier field of the header to a socket of the tunnel connecting the device to another device. When the packet type field indicates that the second packet is a session close packet, the device may close the socket and end the session associated with the socket identified by the session identifier field of the second packet. When the second packet is a data packet (e.g., not a session close packet), the process 400 may continue at block 414.

At block 414, the device may determine whether the session identifier of the second packet corresponds to an open socket of the tunnel. The device may map the identifier of the session identifier field of the second packet to a socket. When the socket is not already open and used in a communication session using the tunnel, the device may determine that a new socket should be opened, and may proceed to block 416 and/or to block 418. When the socket corresponds to an open socket used in a communication session using the tunnel, the device may close any open socket of the tunnel (e.g., the socket used to send the first packet and/or any other open socket) at block 416, and may open a new socket at block 418 to connect to the corresponding port or pathname indicated by the session identifier of the second packet. Opening a new socket may include exchanging a request and response indicating the endpoints or pathnames for the socket.

At block 420, the device may send one or more packets using an open socket. When sending a packet, the device may include a header with the session identifier associated with the socket used by the tunnel between the device and the other device. The device may identify packets with session identifiers which are not associated with open sessions, and may discard the packets. The packets may include media content, connection metrics, and other data. To establish a new socket, the device and the other device may exchange a request and response with socket information to establish the endpoints or pathname for a respective socket.

Figure 5:
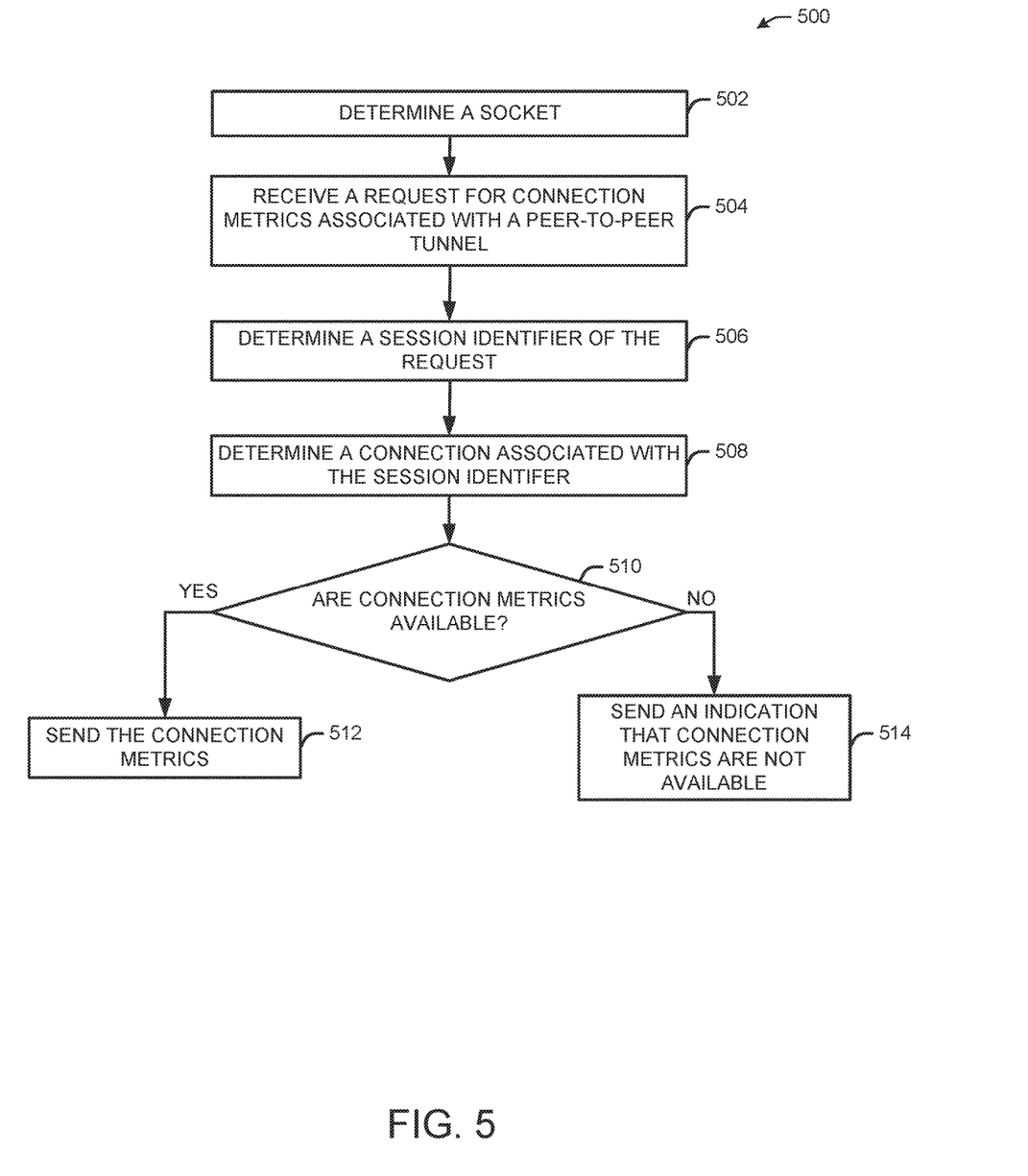
FIG. 5 illustrates a flow diagram for a process for out-of-home transmissions for DVRs, in accordance with one or more example embodiments of the present disclosure.

FIG. 5 illustrates a flow diagram for a process 500 for OOH transmissions for DVRs, in accordance with one or more example embodiments of the present disclosure.

At block 502, a device (e.g., the remote DVR 202 of FIG. 2) may determine a socket (e.g., the socket 215 of FIG. 2 or any UDP socket). The device may create the Unix domain socket and may identify messages on the Unix domain socket. The Unix domain socket may be bound with a pathname and may allow for the exchange of data between processes operating on the device. The Unix domain socket may support UDP and TCP communications.

At block 504, the device may receive a request for connection metrics for a P2P tunnel (e.g., the P2P tunnel 206 of FIG. 2). The metrics may include latency (e.g., a measurement of round trip time of a signal exchange including sending a signal and receiving an acknowledgment that the signal was received), jitter (a measure of change of latency), and throughput (e.g., bits per second transmitted over a channel).

At block 506, the device may determine a session identifier of the request. The request may include a header with multiple fields, including a session identifier field. The bits of a session identifier field may correspond to a numerical value indicating a socket connection using a P2P tunnel between the device and a peer device.

At block 508, the device may determine a connection associated with the session identifier. The device may map the numerical value of the session identifier field to a socket using the P2P tunnel, and the device may identify the socket corresponding to the session identifier.

At block 510, the device may determine whether any connection metrics (e.g., throughput, latency, jitter) are available for the connection associated with the session identifier. The device may send a request for the metrics and receive a response with the metrics. The metrics may be used to evaluate a connection using the P2P tunnel. The device may poll for a response until a timeout is reached. If connection metrics are received (e.g., are available), the device may send the connection metrics to the peer device using the session identifier from a request message at block 512. If no connection metrics are received (e.g., are not available), the device may respond to the peer device with an indication (e.g., a flag) that no valid metrics are available for a particular connection at block 514.

In one or more embodiments, the device or the peer device may maintain QoS requirements. The device may send the metrics to the peer device, which may evaluate a connection with the device and request a new connection if QoS requirements are not being met. The device may determine that the QoS requirements are not being met, and may establish new connections with the peer device. QoS requirements may include threshold values for throughput, jitter, latency, data loss, signal strength, and other transmission characteristics.

Figure 6:
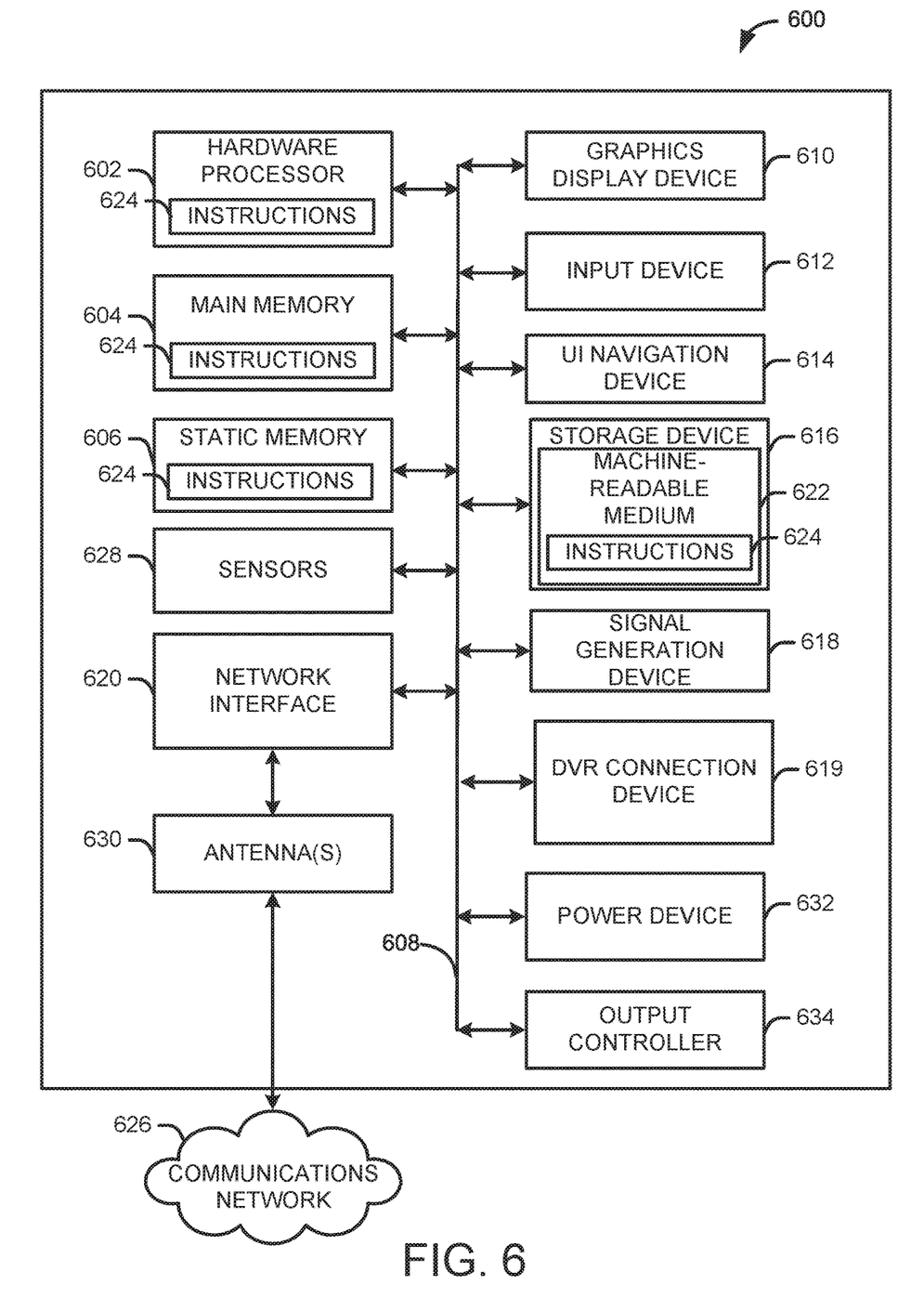
FIG. 6 illustrates a block diagram of an example machine upon which any of one or more techniques (e.g., methods) may be performed, in accordance with one or more example embodiments of the present disclosure.

FIG. 6 illustrates a block diagram of an example of a machine 600 (e.g., the OOH device 102 of FIG. 1, the remote DVR 104 of FIG. 1, the remote DVR 202 of FIG. 2, the mobile device 204 of FIG. 2, the AP 230 of FIG. 2, the AP 232 of FIG. 2, the one or more servers 234 of FIG. 2) or system upon which any one or more of the techniques (e.g., methodologies) discussed herein may be performed. In other embodiments, the machine 600 may operate as a standalone device or may be connected (e.g., networked) to other machines. In a networked deployment, the machine 600 may operate in the capacity of a server machine, a client machine, or both in server-client network environments. In an example, the machine 600 may act as a peer machine in Wi-Fi direct, peer-to-peer (P2P) (or other distributed) network environments. The machine 600 may be a server, a personal computer (PC), a tablet PC, a set-top box (STB), a personal digital assistant (PDA), a mobile telephone, a wearable computer device, a web appliance, a network router, a switch or bridge, or any machine capable of executing instructions (sequential or otherwise) that specify actions to be taken by that machine, such as a base station. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), or other computer cluster configurations.

Examples, as described herein, may include or may operate on logic or a number of components, modules, or mechanisms. Modules are tangible entities (e.g., hardware) capable of performing specified operations when operating.

A module includes hardware. In an example, the hardware may be specifically configured to carry out a specific operation (e.g., hardwired). In another example, the hardware may include configurable execution units (e.g., transistors, circuits, etc.) and a computer readable medium containing instructions where the instructions configure the execution units to carry out a specific operation when in operation. The configuring may occur under the direction of the executions units or a loading mechanism. Accordingly, the execution units are communicatively coupled to the computer-readable medium when the device is operating. In this example, the execution units may be a member of more than one module. For example, under operation, the execution units may be configured by a first set of instructions to implement a first module at one point in time and reconfigured by a second set of instructions to implement a second module at a second point in time.

The machine (e.g., computer system) 600 may include a hardware processor 602 (e.g., a central processing unit (CPU), a graphics processing unit (GPU), a hardware processor core, or any combination thereof), a main memory 604 and a static memory 606, some or all of which may communicate with each other via an interlink (e.g., bus) 608. The machine 600 may further include a power management device 632, a graphics display device 610, an alphanumeric input device 612 (e.g., a keyboard), and a user interface (UI) navigation device 614 (e.g., a mouse). In an example, the graphics display device 610, alphanumeric input device 612, and UI navigation device 614 may be a touch screen display. The machine 600 may additionally include a storage device (i.e., drive unit) 616, a signal generation device 618 (e.g., an emitter, a speaker), a DVR connection device 619, a network interface device/transceiver 620 coupled to antenna(s) 630, and one or more sensors 628, such as a global positioning system (GPS) sensor, a compass, an accelerometer, or other sensor. The machine 600 may include an output controller 634, such as a serial (e.g., universal serial bus (USB), parallel, or other wired or wireless (e.g., infrared (IR), near field communication (NFC), etc.) connection to communicate with or control one or more peripheral devices (e.g., a printer, a card reader, etc.)).

The storage device 616 may include a machine readable medium 622 on which is stored one or more sets of data structures or instructions 624 (e.g., software) embodying or utilized by any one or more of the techniques or functions described herein. The instructions 624 may also reside, completely or at least partially, within the main memory 604, within the static memory 606, or within the hardware processor 602 during execution thereof by the machine 600. In an example, one or any combination of the hardware processor 602, the main memory 604, the static memory 606, or the storage device 616 may constitute machine-readable media.

The DVR connection device 619 may carry out or perform any of the operations and processes (e.g., process 300 of FIG. 3, process 400 of FIG. 4, process 500 of FIG. 5) described and shown above.

In one or more embodiments, the DVR connection device 619 may use a multiplexing protocol to enable reliable data transfer over a byte-stream, allowing bytes sent from one endpoint to another endpoint to arrive in a correct order despite network disruption or data corruption. A relay may route the data from one device to another device. The DVR connection device 619 may intercept a stream of data over a P2P connection, and may add metadata such as a header. The header may include a session size, a type, and a version. The DVR connection device 619 may verify the data in the header to ensure reliable data transfer, increasing reliability and security (e.g., by authenticating a sender and a receiver).

In one or more embodiments, when an OOH device receives a request (e.g., using a video application on the OHH device) to play content recorded at a remote DVR, the DVR connection device 619 may use NAT traversal infrastructure to determine the optimal network route to establish a P2P connection between the OOH device and the remote DVR. The DVR connection device 619 may use tunneling to create the P2P connection between the remote DVR and the OOH device.

In one or more embodiments, the DVR connection device 619 may start a metrics server, which may create a Unix domain socket. The NAT traversal infrastructure may bind the socket with an abstract name (e.g., not tied to a file system). The metrics server may listen for messages received with the Unix domain socket. When a metrics request message is received, the metrics server may identify an associated pseudo-TCP P2P connection which exposes the metrics, and may determine the metrics for a P2P connection. The metrics request message may include socket information for the requesting device, and therefore may send a response with the requested metrics to the relevant socket. A device may create the same type of socket and bind the socket to an abstract name (e.g., no name at all). The device may send a request for the metrics, and if the request fails, the device may select another name corresponding to a name created by the metrics servers. If the device receives a response before a timeout, the device may return the metrics. Otherwise, the device may send an indication that no valid metrics are available for the connection. Because an application on an OOH device may stream video from a remote DVR, the devices may benefit from measuring network performance metrics of the P2P connection between the devices. The NAT traversal infrastructure of a device may make remote connections like local connections to a device, so when a transmission destination is a local host, the device may interpret a P2P OOH connection.

In one or more embodiments, the DVR connection device 619 may use a reliable byte stream provided by a library to communicate between two remote peer devices, such as a remote DVR and an OOH device. To enable a local application on an OOH device to send data to and receive data from the remote DVR, the DVR connection device 619 may open a local TCP port and may listen to the port for incoming connection requests. The local application may connect to the local port to send and receive data to the remote DVR. Data on the local port may be forwarded to a corresponding remote port on the remote DVR based on the connection established between the devices. The DVR connection device 619 may on the remote DVR may create a client socket that connects to a local port on the OOH device. Data sent using the DVR connection device 619 may be sent using a socket connecting the ports, and responses received on the socket may be related through the DVR connection device 619.

In one or more embodiments, the DVR connection device 619 may create virtual packets including session details. The DVR connection device 619 may facilitate serializing the virtual packets over a data stream between two devices. The DVR connection device 619 may receive the virtual packets and identify the session details (e.g., a session identifier). The session details may map to a connection (e.g., socket), allowing a receiving device to identify which connection is associated with the payload of a virtual packet. The virtual packets may be data packets having a payload, or session close packet requests (e.g., indicating that a session has ended and the receiving device should close the corresponding socket) without a payload. The virtual packets may include a header indicating a size of the payload, a version of the protocol used to transmit the virtual packets, a type (e.g., data packet or session close packet), and a session identifier associated with a socket. The virtual packets may be sent in a datagram, but may be more reliable than UDP transmissions because of the use of pseudo-TCP.

In one or more embodiments, session identifiers in data packets sent over a pseudo-TCP P2P connection may allow the DVR connection device 619 to maintain the state of local sockets. The DVR connection device 619 for an application on a device may assign a session identifier to a newly connected socket. The DVR connection device 619 may include session identifiers assigned to a socket when sending any packet over a data stream (e.g., the pseudo-TCP P2P connection). The DVR connection device 619 may identify a session identifier in a received packet. When the DVR connection device 619 determines that a session identifier is not associated with a currently open session, the DVR connection device 619 may open a new client socket (e.g., by sending a response to the identified socket), and may close any open socket. When the DVR connection device 619 generates responses to packets to be sent to the application side, the DVR connection device 619 may include a mapped session identifier for the remote socket to which the packet is intended. When the application side DVR connection device 619 on an OOH device receives packets, the DVR connection device 619 may identify the session identifier in the a packet, and may discard any received packet whose session identifier maps to an inactive session.

In one or more embodiments, if the DVR connection device 619 on a device identifies a request for metrics on a pseudo-TCP P2P connection, the DVR connection device 619 may send a request for the metrics. The metrics may include throughput, latency, and jitter. For example, a device may use throughput to determine whether to adjust video playback. An OOH device playing video received from a remote DVR may measure throughput, and a QoS algorithm may execute on the device to cause a playback adjustment if the throughput does not meet required conditions. For example, if throughput is too low, the QoS algorithm may cause the OOH device to close a socket and request video content and data to be sent on another socket. If latency or jitter do not meet QoS requirements, sockets may be closed or opened. The QoS requirements may ensure that the proper bitrate, display resolution, and other video delivery and display characteristics are met to provide quality playback of video content.

In one or more embodiments, on a remote DVR device, the DVR connection device 619 may identify tunneled connections, and when the DVR connection device 619 identifies a tunneled connection, the DVR connection device 619 may open a TCP connection to a media server to relay contents between the connections. If a port is flagged as being tunneled, the DVR connection device 619 may request and retrieve metrics. For example, using a Get Metrics function, the NAT traversal infrastructure may map a local port to a pseudo-TCP connection and identify the requested metrics.

It is understood that the above are only a subset of what the DVR connection device 619 may be configured to perform and that other functions included throughout this disclosure may also be performed by the DVR connection device 619.

While the machine-readable medium 622 is illustrated as a single medium, the term "machine-readable medium" may include a single medium or multiple media (e.g., a centralized or distributed database, and/or associated caches and servers) configured to store the one or more instructions 624.

Various embodiments may be implemented fully or partially in software and/or firmware. This software and/or firmware may take the form of instructions contained in or on a non-transitory computer-readable storage medium. Those instructions may then be read and executed by one or more processors to enable performance of the operations described herein. The instructions may be in any suitable form, such as but not limited to source code, compiled code, interpreted code, executable code, static code, dynamic code, and the like. Such a computer-readable medium may include any tangible non-transitory medium for storing information in a form readable by one or more computers, such as but not limited to read only memory (ROM); random access memory (RAM); magnetic disk storage media; optical storage media; a flash memory, etc.

The term "machine-readable medium" may include any medium that is capable of storing, encoding, or carrying instructions for execution by the machine 600 and that cause the machine 600 to perform any one or more of the techniques of the present disclosure, or that is capable of storing, encoding, or carrying data structures used by or associated with such instructions. Non-limiting machine-readable medium examples may include solid-state memories and optical and magnetic media. In an example, a massed machine-readable medium includes a machine-readable medium with a plurality of particles having resting mass. Specific examples of massed machine-readable media may include non-volatile memory, such as semiconductor memory devices (e.g., electrically programmable read-only memory (EPROM), or electrically erasable programmable read-only memory (EEPROM)) and flash memory devices; magnetic disks, such as internal hard disks and removable disks; magneto-optical disks; and CD-ROM and DVD-ROM disks.

The instructions 624 may further be transmitted or received over a communications network 626 using a transmission medium via the network interface device/transceiver 620 utilizing any one of a number of transfer protocols (e.g., frame relay, internet protocol (IP), transmission control protocol (TCP), user datagram protocol (UDP), hypertext transfer protocol (HTTP), etc.). Example communications networks may include a local area network (LAN), a wide area network (WAN), a packet data network (e.g., the Internet), mobile telephone networks (e.g., cellular networks), plain old telephone (POTS) networks, wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, and peer-to-peer (P2P) networks, among others. In an example, the network interface device/transceiver 620 may include one or more physical jacks (e.g., Ethernet, coaxial, or phone jacks) or one or more antennas to connect to the communications network 626. In an example, the network interface device/transceiver 620 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding, or carrying instructions for execution by the machine 600 and includes digital or analog communications signals or other intangible media to facilitate communication of such software.

The operations and processes described and shown above may be carried out or performed in any suitable order as desired in various implementations. Additionally, in certain implementations, at least a portion of the operations may be carried out in parallel. Furthermore, in certain implementations, less than or more than the operations described may be performed.

The word "exemplary" is used herein to mean "serving as an example, instance, or illustration." Any embodiment described herein as "exemplary" is not necessarily to be construed as preferred or advantageous over other embodiments. The terms "computing device," "user device," "communication station," "station," "handheld device," "mobile device," "wireless device" and "user equipment" (UE) as used herein refers to a wireless communication device such as a cellular telephone, a smartphone, a tablet, a netbook, a wireless terminal, a laptop computer, a femtocell, a high data rate (HDR) subscriber station, an access point, a printer, a point of sale device, an access terminal, or other personal communication system (PCS) device. The device may be either mobile or stationary.

As used within this document, the term "communicate" is intended to include transmitting, or receiving, or both transmitting and receiving. This may be particularly useful in claims when describing the organization of data that is being transmitted by one device and received by another, but only the functionality of one of those devices is required to infringe the claim. Similarly, the bidirectional exchange of data between two devices (both devices transmit and receive during the exchange) may be described as "communicating," when only the functionality of one of those devices is being claimed. The term "communicating" as used herein with respect to a wireless communication signal includes transmitting the wireless communication signal and/or receiving the wireless communication signal. For example, a wireless communication unit, which is capable of communicating a wireless communication signal, may include a wireless transmitter to transmit the wireless communication signal to at least one other wireless communication unit, and/or a wireless communication receiver to receive the wireless communication signal from at least one other wireless communication unit.

As used herein, unless otherwise specified, the use of the ordinal adjectives "first," "second," "third," etc., to describe a common object, merely indicates that different instances of like objects are being referred to and are not intended to imply that the objects so described must be in a given sequence, either temporally, spatially, in ranking, or in any other manner.

Some embodiments may be used in conjunction with various devices and systems, for example, a personal computer (PC), a desktop computer, a mobile computer, a laptop computer, a notebook computer, a tablet computer, a server computer, a handheld computer, a handheld device, a personal digital assistant (PDA) device, a handheld PDA device, an on-board device, an off-board device, a hybrid device, a vehicular device, a non-vehicular device, a mobile or portable device, a consumer device, a non-mobile or non-portable device, a wireless communication station, a wireless communication device, a wireless access point (AP), a wired or wireless router, a wired or wireless modem, a video device, an audio device, an audio-video (A/V) device, a wired or wireless network, a wireless area network, a wireless video area network (WVAN), a local area network (LAN), a wireless LAN (WLAN), a personal area network (PAN), a wireless PAN (WPAN), and the like.

Some embodiments may be used in conjunction with one way and/or two-way radio communication systems, cellular radio-telephone communication systems, a mobile phone, a cellular telephone, a wireless telephone, a personal communication system (PCS) device, a PDA device which incorporates a wireless communication device, a mobile or portable global positioning system (GPS) device, a device which incorporates a GPS receiver or transceiver or chip, a device which incorporates an RFID element or chip, a multiple input multiple output (MIMO) transceiver or device, a single input multiple output (SIMO) transceiver or device, a multiple input single output (MISO) transceiver or device, a device having one or more internal antennas and/or external antennas, digital video broadcast (DVB) devices or systems, multi-standard radio devices or systems, a wired or wireless handheld device, e.g., a smartphone, a wireless application protocol (WAP) device, or the like.

Some embodiments may be used in conjunction with one or more types of wireless communication signals and/or systems following one or more wireless communication protocols, for example, radio frequency (RF), infrared (IR), frequency-division multiplexing (FDM), orthogonal FDM (OFDM), time-division multiplexing (TDM), time-division multiple access (TDMA), extended TDMA (E-TDMA), general packet radio service (GPRS), extended GPRS, code-division multiple access (CDMA), wideband CDMA (WCDMA), CDMA 2000, single-carrier CDMA, multi-carrier CDMA, multi-carrier modulation (MDM), discrete multi-tone (DMT), Bluetooth®, global positioning system (GPS), Wi-Fi, Wi-Max, ZigBee, ultra-wideband (UWB), global system for mobile communications (GSM), 2G, 2.5G, 3G, 3.5G, 4G, fifth generation (5G) mobile networks, 3GPP, long term evolution (LTE), LTE advanced, enhanced data rates for GSM Evolution (EDGE), or the like. Other embodiments may be used in various other devices, systems, and/or networks.

It is understood that the above descriptions are for purposes of illustration and are not meant to be limiting.

Although specific embodiments of the disclosure have been described, one of ordinary skill in the art will recognize that numerous other modifications and alternative embodiments are within the scope of the disclosure. For example, any of the functionality and/or processing capabilities described with respect to a particular device or component may be performed by any other device or component. Further, while various illustrative implementations and architectures have been described in accordance with embodiments of the disclosure, one of ordinary skill in the art will appreciate that numerous other modifications to the illustrative implementations and architectures described herein are also within the scope of this disclosure.

Program module(s), applications, or the like disclosed herein may include one or more software components including, for example, software objects, methods, data structures, or the like. Each such software component may include computer-executable instructions that, responsive to execution, cause at least a portion of the functionality described herein (e.g., one or more operations of the illustrative methods described herein) to be performed.

A software component may be coded in any of a variety of programming languages. An illustrative programming language may be a lower-level programming language such as an assembly language associated with a particular hardware architecture and/or operating system platform. A software component comprising assembly language instructions may require conversion into executable machine code by an assembler prior to execution by the hardware architecture and/or platform.

Another example programming language may be a higher-level programming language that may be portable across multiple architectures. A software component comprising higher-level programming language instructions may require conversion to an intermediate representation by an interpreter or a compiler prior to execution.

Other examples of programming languages include, but are not limited to, a macro language, a shell or command language, a job control language, a script language, a database query or search language, or a report writing language. In one or more example embodiments, a software component comprising instructions in one of the foregoing examples of programming languages may be executed directly by an operating system or other software component without having to be first transformed into another form.

A software component may be stored as a file or other data storage construct. Software components of a similar type or functionally related may be stored together such as, for example, in a particular directory, folder, or library. Software components may be static (e.g., pre-established or fixed) or dynamic (e.g., created or modified at the time of execution).

Software components may invoke or be invoked by other software components through any of a wide variety of mechanisms. Invoked or invoking software components may comprise other custom-developed application software, operating system functionality (e.g., device drivers, data storage (e.g., file management) routines, other common routines and services, etc.), or third-party software components (e.g., middleware, encryption, or other security software, database management software, file transfer or other network communication software, mathematical or statistical software, image processing software, and format translation software).

Software components associated with a particular solution or system may reside and be executed on a single platform or may be distributed across multiple platforms. The multiple platforms may be associated with more than one hardware vendor, underlying chip technology, or operating system. Furthermore, software components associated with a particular solution or system may be initially written in one or more programming languages, but may invoke software components written in another programming language.

Computer-executable program instructions may be loaded onto a special-purpose computer or other particular machine, a processor, or other programmable data processing apparatus to produce a particular machine, such that execution of the instructions on the computer, processor, or other programmable data processing apparatus causes one or more functions or operations specified in any applicable flow diagrams to be performed. These computer program instructions may also be stored in a computer-readable storage medium (CRSM) that upon execution may direct a computer or other programmable data processing apparatus to function in a particular manner, such that the instructions stored in the computer-readable storage medium produce an article of manufacture including instruction means that implement one or more functions or operations specified in any flow diagrams. The computer program instructions may also be loaded onto a computer or other programmable data processing apparatus to cause a series of operational elements or steps to be performed on the computer or other programmable apparatus to produce a computer-implemented process.

Additional types of CRSM that may be present in any of the devices described herein may include, but are not limited to, programmable random access memory (PRAM), SRAM, DRAM, RAM, ROM, electrically erasable programmable read-only memory (EEPROM), flash memory or other memory technology, compact disc read-only memory (CD-ROM), digital versatile disc (DVD) or other optical storage, magnetic cassettes, magnetic tape, magnetic disk storage or other magnetic storage devices, or any other medium which can be used to store the information and which can be accessed. Combinations of any of the above are also included within the scope of CRSM. Alternatively, computer-readable communication media (CRCM) may include computer-readable instructions, program module(s), or other data transmitted within a data signal, such as a carrier wave, or other transmission. However, as used herein, CRSM does not include CRCM.

Although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without user input or prompting, whether these features, elements, and/or steps are included or are to be performed in any particular embodiment.

What is claimed is:

1. A method, comprising:

receiving, at a first port of a first device, a first packet from a second port of a second device using a pseudo-transmission control protocol (pseudo-TCP) peer-to-peer (P2P) tunnel connection between the first device and the second device, wherein the first device is connected to a first wireless network, wherein the second device is connected to a second wireless network;

determining, by the first device, based on the first packet, a first session identifier associated with the pseudo-TCP P2P tunnel connection;

determining, by the first device, based on the first session identifier, a first socket associated with the first port and the second port;

receiving, at the first port, a second packet from a third port of the second device using the pseudo-TCP P2P tunnel connection;

determining, by the first device, based on the second packet, a second session identifier associated with the pseudo-TCP P2P tunnel connection;

determining, by the first device, based on the second session identifier, a second socket associated with the first port and the third port;

sending, by the first device, after receiving the second packet, a third packet using the second socket, wherein the third packet comprises the first session identifier; and sending, by the first device, after receiving the second packet, a fourth packet using the second socket, wherein the fourth packet comprises the second session identifier.

2. The method of claim 1, further comprising:
determining that the second session identifier is not associated with an open socket using the pseudo-TCP P2P tunnel connection; and
opening the second socket.

3. The method of claim 1, further comprising:
receiving a socket close request comprising the first session identifier; and
closing the first socket before sending the fourth packet.

4. The method of claim 1, further comprising:
determining connection metrics associated with the first port; and
sending the connection metrics using the first port.

5. A method, comprising:
receiving, by a first device, a first packet from a second device using a peer-to-peer (P2P) connection between the first device and a second device;
determining, by the first device, based on the first packet, a first session identifier associated with the P2P connection;
determining, by the first device, based on the first session identifier, a first socket associated with the P2P connection;
receiving, by the first device, a second packet from the second device using the P2P connection;
determining, by the first device, based on the second packet, a second session identifier associated with the P2P connection;
determining, by the first device, based on the second session identifier, a second socket associated with the P2P connection; and
sending, by the first device, a third packet using the second socket, wherein the third packet comprises the second session identifier.

6. The method of claim 5, wherein determining the second socket further comprises:
determining that the second session identifier is not associated with an open socket using the P2P connection; and
opening the second socket.

7. The method of claim 5, further comprising:
determining a Unix domain socket associated with the P2P connection; and
determining, based on the Unix domain socket, connection metrics associated with the P2P connection, wherein the third packet comprises the connection metrics.

8. The method of claim 5, further comprising, receiving a disconnection request from the second device using the P2P connection, wherein the disconnection request comprises the first session identifier.

9. The method of claim 8, further comprising:
identifying the first session identifier in the disconnection request; and
closing the first socket.

10. The method of claim 5, wherein the first packet comprises a payload, further comprising receiving a disconnection request, wherein the disconnection request comprises the first session identifier, and wherein the disconnection request fails to comprise a payload.

11. The method of claim 5, wherein the first packet comprises a payload, a first indication of a type of packet, and a second indication of a size of the payload, wherein the size is greater than zero, and wherein the type of packet is data.

12. The method of claim 5, wherein the first packet is included in a user datagram protocol (UDP) datagram, wherein the UDP datagram comprises a header consisting of four bytes and a payload having a length less than or equal to 64 kilobytes.

13. The method of claim 5, wherein the P2P connection is a pseudo-transmission control protocol (pseudo-TCP) P2P tunnel.

14. The method of claim 5, wherein the first device is associated with a first wireless network, wherein the second device is associated with a second wireless network, and wherein the first wireless network is different from the second wireless network.

15. The method of claim 5, wherein the first socket is associated with a first port of the first device and a second port of the second device, wherein the second socket is associated with the first port and a third port of the second device, and wherein the second port is different from the third port.

16. A device comprising memory coupled to at least one processor, the at least one processor configured to:
receive, at a first port of the device, a first packet from a second device using a peer-to-peer (P2P) connection between the device and the second device, wherein the first packet comprises a first session identifier, wherein the first session identifier is associated with a first socket based on the first port and a second port of the second device;
receive, at the first port, a second packet from the second device using the P2P connection, wherein the second packet comprises a second session identifier;
determine, by the device, a second socket based on the second session identifier, wherein the second socket is based on the first port and a third port of the second device; and
send, by the device, a third packet using the second socket, wherein the third packet comprises the second session identifier.

17. The device of claim 16, wherein to determine the second socket comprises the at least one processor being further configured to:
determine that the second session identifier is not associated with an open socket of the P2P connection; and
open the second socket.

18. The device of claim 16, wherein the at least one processor is further configured to:
determine a Unix domain socket associated with the P2P connection; and
determine, based on the Unix domain socket, connection metrics associated with the P2P connection, wherein the third packet comprises the connection metrics.

19. The device of claim 16, wherein the third packet comprises a payload, wherein the device is associated with a first wireless network, wherein the second device is associated with a second wireless network, and wherein the first wireless network is different from the second wireless network.

20. The device of claim 16, wherein the at least one processor is further configured to:
receive a disconnection request from the second device using the P2P connection, wherein the disconnection request comprises the first session identifier; and
close the first socket.

* * * * *